June 17, 1941.  B. W. MANTLE  2,245,695
PULLEY
Filed April 22, 1940
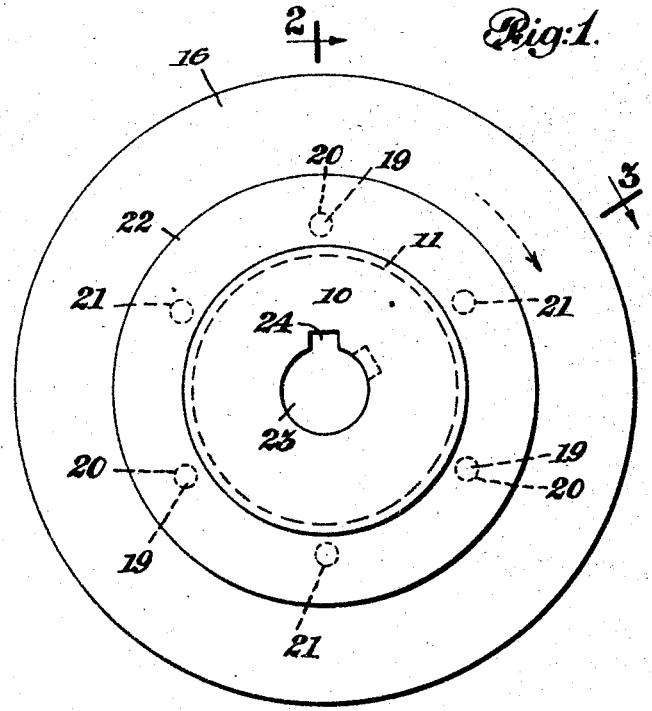
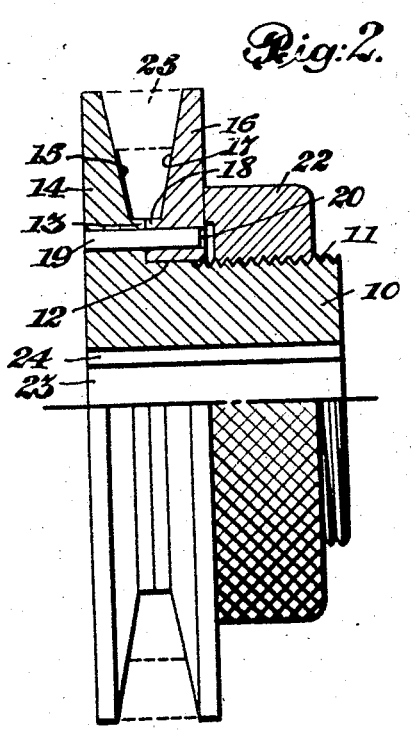
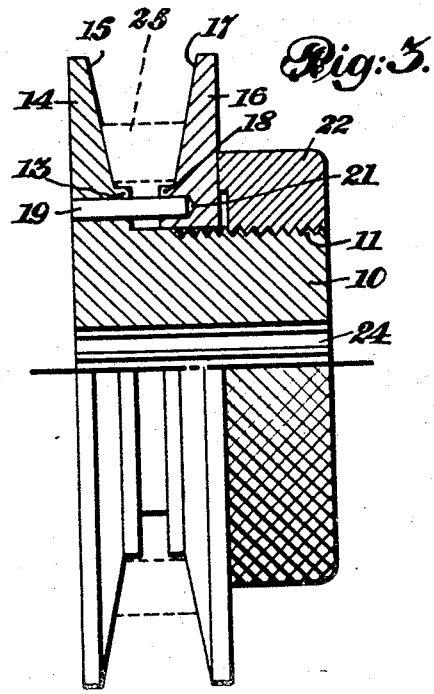
INVENTOR
*Burr Ward Mantle*
BY
*Van Deventer + Grier*
ATTORNEYS Patented June 17, 1941

2,245,695

UNITED STATES PATENT OFFICE 2,245,695

PULLEY

Burr Ward Mantle, Pittsford, N. Y., assignor to The American Brake Shoe and Foundry Company, a corporation of Delaware Application April 22, 1940, Serial No. 330,860

6 Claims. (Cl. 74—230.17)

This invention relates to improvements in pulleys, and has for an object the provision of a pulley operable at a given effective diameter and adapted to be changed by a simple manual adjustment to operate at a different effective diameter.

Another object of the invention is the provision in a grooved pulley of members cooperating to form a V, and means to set the members relative to each other with a wanted spacing therebetween.

A further object of the invention is the provision in a pulley of two members cooperating to form a V groove, one of said members carrying projections and the other of said members carrying holes adapted to engage said projections, some of said holes being bottomed and others of said holes being clear, whereby when said members engage the bottomed holes, the width of the V groove is wider than when said projections extend into the clear holes.

Other objects will be apparent to those skilled in the art.

Referring to the drawing:

Figure 1 is an end elevation of a pulley comprising one embodiment of the invention;

Figure 2 is a side elevation, partly in section, showing the relative position of the members when the pulley is adjusted for a large effective pitch diameter; and Figure 3 is a side elevation, partly in section, showing the relative positions of the parts when the pulley is adjusted to operate at an effective pitch diameter smaller than that shown in Figure 2.

Referring to Figures 1, 2 and 3, the pulley consists of a hub member 10 having threads 11 formed thereon and having a straight portion 12 between the threads 11 and the shoulder 13 of a flange 14. The flange 14 is preferably formed integral with the hub 10 and has an angular surface 15 which forms one side of the V.

An angular member 16 has a hole formed therein which forms a fit on the straight portion 12 of the hub. The annular member has an angular face 17 which forms the other half of the V. The surface 17 terminates in a boss 18 which abuts the shoulder 13 when the pulley is set to operate at an effectively large pitch diameter.

The flange portion 14 has a plurality of holes formed therein into which are forced pins 19. In the embodiment shown I employ three such pins, but am not limited to the number of pins employed. The annular member 16 has formed therein three holes 20 which extend clear through the member, and spaced between these holes are three holes 21 which are drilled a predetermined depth and therefore have bottoms. The holes 20 extend clear through the member and may be seen in Figure 2, while the holes 21 are shown in dotted lines in Figure 1 and may be seen in section in Figure 3.

A suitable nut 22 has threads which match the threads 11 and is utilized for clamping the members together in one or the other of the two adjustable positions. The pulley has a suitable hole 23 extending therethrough and may be provided with a suitable keyway 24.

Assuming that the pulley is set with the pins 19 engaging the holes 20, as shown in Figure 2, the hubs 13 and 18 will abut each other, due to the fact that the holes 20 have no bottoms. The nut 22 holds the members in this fixed relation with the result that the belt 25 rides on the top of the V and the pulley (assuming that it is driving) will drive the belt at a given rate.

Now assuming that it is desired to drive some driven member at a slower rate, the nut 22 is loosened and backed off to a point where the pins 19 can be disengaged from the holes 20. The annular member 16 is then given a turn by hand of 60° to bring the pins 19 in line with the holes 21; the ends of the holes terminating in the face of the boss 18 may be enlarged to make it easy for the operator to locate them. Now with the pins in line with the holes 21, the member 16 is shoved to the left, as viewed in Figure 3 and the pins 19 will bottom in the holes 21, with the result that the faces of the bosses 13 and 18 are spaced apart from each other and therefore the angular faces 15 and 17 are spaced apart from each other farther than they are in the setting shown in Figure 2, with the result that the belt 25 will extend more deeply into the V and therefore will operate on a smaller effective pitch diameter.

Although the arrangement herein shown and described discloses a simple two speed V belt pulley which may be very easily and quickly set to operate under either one of two conditions, it is obvious that by the method herein disclosed, pulleys settable to either one of a plurality of conditions may be made without departing from the spirit of the invention. Although the hub 10 and the flange 14 are shown as integral with each other, as a further modification I contemplate making the hub with the shoulder at one end and threaded at the other end, and making both flanges mountable on the hub. By this arrangement the hub may remain stationary on the driving member and the alignment of the adjusted V groove between the flanges may be aligned with the driven pulley independently of the hub and without moving the motor or the driving means to effect such alignment.

It is obvious that the number of conditions may be increased, and it is also obvious that many changes may be made in the examples of the invention herein shown and described within the scope of the appended claims, without departing from the spirit of the present invention, and such changes are contemplated.

What is claimed is:

1. In a pulley, a hub for mounting said pulley on a shaft, a flange in fixed relation to said hub, a second flange positionable on said hub, the adjacent faces of said flanges being angular with respect to the radial planes thereof, thereby forming a V shaped groove therebetween, means for positioning said flanges in fixed relation to each other for one width of said V groove, and for spacing said flanges apart from each other axially and thereby increasing the width of said groove, said means for positioning and for spacing the flanges being comprised of axial projections on one of said flanges and cooperative depressions formed in the other of said flanges whereby different spacings between the flanges may be defined, and means to lock said flanges in either of the aforementioned relations.

2. In a pulley, a hub for mounting said pulley on a shaft, a flange in fixed relation to said hub, a second flange positionable on said hub, the adjacent faces of said flange being angular with respect to the radial planes thereof, thereby forming a V shaped groove therebetween, an axial projection on one of said flanges, a first hole formed in the other of said flanges, a second hole of less depth than said first hole also formed in said last mentioned flange, said projection being adapted to engage said first mentioned hole for defining one width of said V shaped groove and adapted to engage said second mentioned hole for widening said V shaped groove, and means for locking said flanges in either of the aforementioned relations.

3. In a pulley, a hub for mounting said pulley on a shaft, a flange in fixed relation to said hub, a second flange positionable on said hub, the adjacent faces of said flange being angular with respect to the radial planes thereof, thereby forming a V shaped groove therebetween, a plurality of axial projections on one of said flanges equally spaced radially from the center of said hub and angularly spaced apart from each other, a plurality of holes formed in the other of said flanges and adapted to receive said projections, a second plurality of holes of less depth than said first holes also formed in said last mentioned flange and also adapted to receive said projections whereby when said projections engage said first holes one width of said V shaped groove is obtained, and when said projections engage said second holes said V shaped groove is widened, and means for locking said flanges in either of the aforementioned relations.

4. In a pulley, a hub for mounting said pulley on a shaft, a flange in fixed relation to said hub, a second flange positionable on said hub, the adjacent faces of said flange being angular with respect to the radial planes thereof, thereby forming a V shaped groove therebetween, a plurality of axial projections carried by said first flange and partially overlying said hub, a plurality of holes formed in said second flange, some of said holes being through holes, others bottomed holes, said holes and said pins having equal radial spacings from the center of said hub whereby when said pins enter said through holes said flanges abut each other adjacent to the hub and thereby define one width of said V shaped groove, said pins also being adapted when engaged by the bottoms of said bottomed holes to define a wider width of said V shaped groove.

5. In a pulley, a hub for mounting said pulley on a shaft, a flange in fixed relation to said hub, a second flange positionable on said hub, the adjacent faces of said flange being angular with respect to the radial planes thereof, thereby forming a V shaped groove therebetween, an axial projection on one of said flanges overlying said hub, locating means cooperative with said projection carried in the other of said flanges and comprised of an axial opening of one depth for defining one width of a V shaped groove and adapting said pulley to operate a belt on a given effective pitch diameter, and comprised of a second axial opening of a different depth cooperative with said projection for adapting said pulley to operate said belt on a different effective pitch diameter, and means for locking said flanges in fixed relation to each other for either of the aforementioned conditions.

6. In a pulley, a hub for mounting said pulley on a shaft, a flange in driven relation to said hub, a second flange positionable on said hub, the adjacent faces of said flanges being angular with respect to the radial planes thereof thereby forming a V-shaped groove therebetween, means for positioning said flanges in fixed relation to each other for one width of V groove and comprised of an axial projection on one of said flanges and a cooperating depression formed in the other of said flanges, and means for spacing said flanges apart from each other axially to increase the width of said groove and comprised of a depression step shallower than said first mentioned depression for cooperating with said projection, and means for locking the flanges together in either of the aforementioned relations.

BURR WARD MANTLE.